(12) United States Patent
Heilmann

(10) Patent No.: US 11,745,437 B2
(45) Date of Patent: Sep. 5, 2023

(54) METHOD AND DEVICE FOR INSPECTING A JOINING SURFACE

(71) Applicant: DEUTSCHES ZENTRUM FÜR LUFT- UND RAUMFAHRT E.V., Cologne (DE)

(72) Inventor: Lennert Heilmann, Bremen (DE)

(73) Assignee: DEUTSCHES ZENTRUM FUER LUFT-UND RAUMFAHRT E.V., Cologne (DE)

( * ) Notice: Subject to any disclaimer, the term of this patent is extended or adjusted under 35 U.S.C. 154(b) by 0 days.

(21) Appl. No.: 16/624,111

(22) PCT Filed: May 11, 2018

(86) PCT No.: PCT/EP2018/062213
§ 371 (c)(1),
(2) Date: Dec. 18, 2019

(87) PCT Pub. No.: WO2018/233928
PCT Pub. Date: Dec. 27, 2018

(65) Prior Publication Data
US 2020/0130289 A1 Apr. 30, 2020

(30) Foreign Application Priority Data
Jun. 19, 2017 (DE) ...................... 10 2017 113 430.1

(51) Int. Cl.
*B29C 65/82* (2006.01)
*B29C 65/00* (2006.01)
(Continued)

(52) U.S. Cl.
CPC ........ *B29C 66/1122* (2013.01); *B29C 66/721* (2013.01); *B29C 65/483* (2013.01);
(Continued)

(58) Field of Classification Search
CPC ................ B29C 65/8223; G01N 19/04; Y10T 156/1189
(Continued)

(56) References Cited

U.S. PATENT DOCUMENTS 5,323,170 A * 6/1994 Lang ........................ H01Q 1/42
343/705
7,736,452 B2 6/2010 McBroom
(Continued)

FOREIGN PATENT DOCUMENTS

DE 10 2015 111 328 A1 1/2017

*Primary Examiner* — Scott W Dodds
(74) *Attorney, Agent, or Firm* — WCF IP

(57) ABSTRACT

A method for inspecting a joining surface (14) of a substrate, wherein a component is to be adhered to the joining surface of the substrate by means of an adhesive material (27), wherein the method comprises the following steps: •—providing at least one planar test textile (20), which has a fiber material (21) and an adhesive primer (22), •—applying the planar test textile to at least one part of the joining surface of the substrate to which the component is to be adhered so that the adhesive primer of the planar test textile contacts the joining surface of the substrate, •—at least partially curing the adhesive primer of the planar test textile in order to integrally bond the planar test textile to the substrate by means of the adhesive primer, •—pulling off the planar test textile after at least partially curing the adhesive primer and inspecting the joining surface by means of a qualitative evaluation of the fracture pattern between the cured adhesive primer and the planar test textile and/or by means of a quantitative evaluation of the pull-off force determined when pulling off the planar test textile.

10 Claims, 6 Drawing Sheets

(d)

(e)

(f)

Figure 1A:
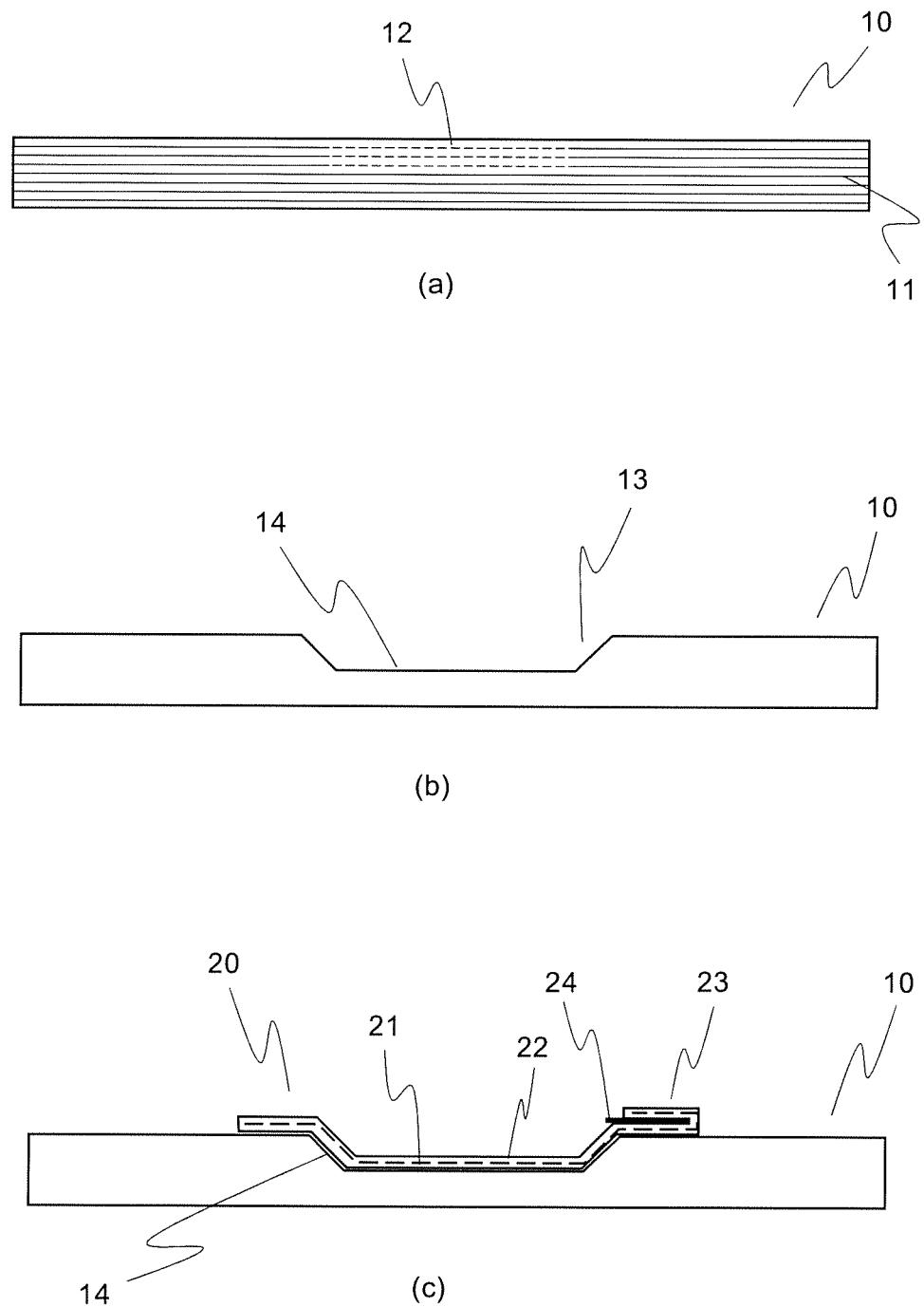

(51) Int. Cl.
*B29C 65/48* (2006.01)
*B29L 31/30* (2006.01)

(52) U.S. Cl.
CPC .......... *B29C 65/8223* (2013.01); *B29C 66/71* (2013.01); *B29C 66/73921* (2013.01); *B29C 66/742* (2013.01); *B29L 2031/3076* (2013.01)

(58) Field of Classification Search
USPC .......................................................... 156/64
See application file for complete search history.

(56) References Cited

U.S. PATENT DOCUMENTS

| | | |
|---|---|---|
| 9,347,868 B2 | 5/2016 | Van Voast et al. |
| 2008/0011075 A1 | 1/2008 | Menendez et al. |
| 2013/0112005 A1 | 5/2013 | Bethke et al. |
| 2014/0326074 A1* | 11/2014 | Van Voast .............. G01N 19/04 |
| | | 73/827 |
| 2015/0258765 A1* | 9/2015 | Van Voast .............. C09D 11/10 |
| | | 156/64 |
| 2016/0033388 A1* | 2/2016 | Raeckers ............... G01N 19/04 |
| | | 73/827 |

* cited by examiner (d)

(e)

(f)

(g)

METHOD AND DEVICE FOR INSPECTING A JOINING SURFACE

The invention relates to a method and a device for inspecting a joining surface of a substrate, the intention being to adhere a structural element to the joining surface of the substrate using an adhesive. The invention also relates to a method for bonding a substrate to such a structural element, employing the inspection method.

On account of their weight-specific strength and stiffness, it is now virtually impossible not to conceive of fiber composite materials in the production of any components. These fiber composite materials consist primarily of two essential constituents: a fiber material and a matrix material. In the production of fiber composite components from a fiber composite material, the fiber material is generally brought into the corresponding form of the subsequent component, and then the matrix material infused into the fiber material is cured. Curing is accomplished in the great majority of cases through temperature and possibly pressure exposure. The curing forces the load-bearing fibers of the fiber material into their predefined direction, where together with the cured matrix material they form an integral unit for load dissipation.

Fiber composite components unfortunately have certain disadvantages over isotropic materials in the production context, since the component shape of a fiber composite component is formed in general by corresponding shaping tools which constitute a kind of negative impression of the subsequent component shape. It is therefore not uncommon for complex fiber composite components to be bonded together from various structural elements, either produced from fiber composite materials or composed of isotropic materials, in order for the complex geometry to be able to be produced.

Fiber composite components may also be repaired, in cases of local damage, by the adhering of repair patches: the damaged site is first prepared by removing the fiber material and matrix material of the fiber composite material at the damaged site, and subsequently a repair patch is then bonded in, being bonded into the resultant space and hence filling it again.

Adhesive bonding of this kind, where at least one of the adherends is a fiber composite component made from a fiber composite material, is not entirely uncritical with regard to certification and validation. Accordingly, in the aerospace sector in particular, high standards must be imposed on any such adhesive bond in order to satisfy the safety requirements—this also applies in particular to safety-critical components. The particular challenge here is that the possibility for nondestructive testing of bonds or adhesive connections is limited. At the present time there is no nondestructive testing method allowing the bond strength of adhesive bonds to be verified.

Because of this and of damage events in the past, the certification authorities mandate special regulations for structural bonding in aviation. Accordingly, under EASA AMC 20-29 or FAA AC 20-107b, a safety-relevant bond is presently permissible only when a) possible failure of the bond is restricted by construction measures to an uncritical magnitude (typically by means of alternative load pathways or redundancy in the construction, by additional riveting, for example), b) each individual bonded connection is loaded with the critical maximum design load, in order to validate the strength of the bond, or c) a repeatable and reliable nondestructive testing method is employed that provides assurance of the strength of each individual adhesive bond.

A further substantial disadvantage effecting the repair of fiber composite components by adhesive bonding is that the structure for repair has already been in operation and may in that case have come into contact with media which adversely affect the development of the forces of adhesion during bonding. Consequently, at the present time, bonded repairs (without additional application of rivets) are not carried out if the failure of the repair is critical as regards the safety of the aircraft. In order for bonded repairs to be carried out nevertheless in harmony with the approval authorities, there is intense research into possibilities for the validation of a repair which has been made.

Known from U.S. Pat. No. 7,736,452 B2 is a method for the nondestructive inspection of an adhesive bond in the repair of fiber composite components, where the adhesive bond is inspected indirectly. The damaged site on the fiber composite component, in a first step, is repaired using a corresponding bonded-in repair patch. Subsequently, in the vicinity of the repaired site, a test patch having the same properties and the same material as the repair patch is adhered, and is loaded with a corresponding force after the adhesive bond has cured. If the test patch withstands the force thus applied, the repaired site is assumed to be durable.

Known from US 2008/0011075 A1 is a method for the quality control of a fiber composite component and of a possible adhesive bond, a metallic structure being adhered in this case to the surface of the fiber composite component. This metallic structure has a designated fracture site. After the adhesive bond has cured, the metallic structure is then exposed to a force. If fracture occurs at the designated fracture site, the adhesive bond to the surface of the fiber composite component is effective. If the adhesive bond fractures, rather than the designated fracture site, then the bond was not defect-free.

Not only with fiber composite components, however, are there concerns to carry out nondestructive inspection of the joining surface for the purpose of promoting adhesion between a substrate and other structural elements. Surface coating, accordingly, is a widespread method for fulfilling certain technical or esthetic functions. In civil aviation, for example, corresponding aluminum structures are used which are exposed to aggressive media and are consequently at particularly high risk of corrosive attack. These aluminum structures are therefore subjected to electrochemical treatment and are subsequently sealed with a surface coating. This priming coat acts on the one hand as protection from corrosion and on the other hand as an adhesion-promoting coat for a subsequent adhesive bonding operation.

Presently, however, there is no method in existence which allows the joining surface of a substrate, whether produced from a fiber composite material or from another engineering material, to be inspected directly for its effectiveness in relation to a bond site. It is therefore an object of the present invention to specify an improved method allowing the joining surface of a substrate, especially of a fiber composite component as substrate, to which a structural element is to be bonded, to be inspected directly in relation to the adhesive bond, and allowing the effectiveness of such a bond to be ensured in advance.

Proposed is a method for inspecting a joining surface of a substrate, the intention being to bond one or more structural elements to the substrate joining surface using an adhesive material or adhesive.

The substrate may comprise a fiber composite component made of a fiber composite material, where the fiber composite component may have been produced from a fiber composite material. A fiber composite material of this kind is of the generic type comprising a fiber material and a matrix material. Furthermore, a fiber composite material of this kind may comprise further components and/or materials specific to the application.

The substrate may, however, also be a different material, particularly an isotropic material, such as, for example, a polymer material, metal material, organic materials and/or inorganic materials. Polymer materials used may be, for example, thermosets (epoxides, unsaturated polyesters, vinyl esters, phenolic resins), elastomers (rubber, polysulfides, silicones, polyurethanes), thermoplastics (polyetherketoneketone, polyamide, polyesters, etc.). Metal materials and/or alloys that are contemplated include, in particular, steel, aluminum, titanium, magnesium, nonferrous metals, etc. Organic materials that may find application include, in particular, bone, wood, and teeth. Inorganic materials conceivable are, in particular, glass, cement, ceramic, stone. The substrate here can specifically not be a fiber composite component produced from a fiber composite material.

A structural element may consist of the same material as the substrate, or comprise such a material. It is also conceivable, however, for the structural element to consist of or to comprise a different material, as stated above. One conceivable combination, which is frequently encountered in civil aviation, is a substrate made of a fiber composite material, the intention being to adhere a structural element made from a metal material to said substrate. The structural element may alternatively comprise a material which intrinsically comprises an adhesive material, such as surface coatings, sealants or paints, for example. Conceivable in particular here is the direct placement of a prepreg (preimpregnated fiber material of a fiber composite material) on the adhesive primer and curing thereof, the matrix material of the prepreg in that case forming the property of an adhesive.

In order to allow the joining surface to be inspected directly and above all nondestructively, the invention proposes first providing at least one sheetlike test textile which comprises a fiber material and an adhesive primer. An adhesive primer here is a material which is applied to the joining surface generally in preparation for an adhesive bond to be produced. After an adhesive primer has been cured, the adhesive would be applied to the adhesive primer, with the adhesive primer consequently representing a connecting element between the joining surface of the component, on the one hand, and the adhesive, on the other. An adhesive primer serves here in preparation of the joining surface for a subsequent adhesive bond.

For the purposes of the present invention, an adhesive primer of this kind may here comprise matrix materials which are part of a fiber composite material. In one advantageous embodiment, in which the substrate is formed of a fiber composite material, the adhesive primer may be the matrix material of which the fiber composite component is produced, or the matrix material which is part of the fiber composite material of which the repair patch is produced. Additionally, however, the adhesive primer may be any material intended to form the subsequent layer of adhesive. The adhesive primer and the adhesive intended to adhere the subsequent structural element to the fiber composite component may be the same material.

The sheetlike test textile further comprises a fiber material, which is produced preferably of textile or nontextile raw materials and has preferably been processed from linear constructs to form a sheetlike fabric. The fiber material of the sheetlike test textile may have a flexurally slack condition in the uncured state of the adhesive primer. The materials in question here may in particular be fiber materials which are also used for producing fiber composite components and are therefore part of fiber composite materials. It is also conceivable, however, for the fiber material to be, for example, a metallic material, which is fundamentally not flexurally slack, but undergoes deformation under a tensile and/or compressive load.

The sheetlike test textile here is generally provided in such a way that the fiber material of the sheetlike test textile is already impregnated with the adhesive primer and is therefore available immediately for the subsequent steps. Also conceivable, however, is the separate provision of fiber material and adhesive primer, which are then joined together in the course of the further method steps yet to be discussed.

In the next step, then, the sheetlike test textile is applied to at least part of the joining surface of the substrate, so that the adhesive primer of the sheetlike test textile makes contact with the joining surface of the substrate. The joining surface, in other words, is therefore occupied or wetted by the adhesive primer of the sheetlike test textile. Where the fiber material of the test textile already comprises the adhesive primer as a joint unit, the adhesive primer and the fiber material are applied in one step to the substrate. Where the two components are present separately, either first the adhesive primer and then the fiber material of the test textile are applied, or first the fiber material of the test textile is applied and then the adhesive primer is applied to the fiber material. In the second case, the adhesive primer infuses into the fiber material of the test textile so as to form the boundary layer between fiber material and joining surface.

In the next step, after the sheetlike test textile has been applied to the joining surface, the adhesive primer of the sheetlike test textile is cured, in order to connect the sheetlike test textile to the substrate, substance to substance, in the region of the joining surface, using the adhesive primer. Accordingly, depending on the primer used, the adhesive primer may be cured, for example, at room temperature or at a corresponding temperature with or without exposure to pressure. Depending on the adhesive primer used, the primer is activated by the corresponding, specific carrier, thereby initiating the curing process and subjecting the adhesive primer to partial or complete curing, or consolidation. After the curing/polymerization of the adhesive primer, the sheetlike test textile has been firmly connected or bonded to the substrate in the region of the joining surface, using the adhesive primer.

When the adhesive primer of the sheetlike test textile is cured, the sheetlike test textile is removed from the joining surface, preferably by the exertion of a force on the test textile substantially orthogonally to the joining surface and in a direction away from the joining surface. The joining surface can then be subsequently examined by qualitative evaluation of the fracture pattern and/or by quantitative evaluation of the removal force found on removal of the sheetlike test textile. This removal force may be dissipated via the time and/or via the path or test path, thereby forming a removal force profile over the time and/or over the path. Evaluation of the fracture pattern here means that either the joining surface of the component, or the test textile, is investigated, or both.

In the event of inadequate or insufficient attachment of the adhesive primer on the joining surface of the substrate, the primer is separated from the substrate, thus showing the deficient pretreatment of the joining surface. In the case of correct surface pretreatment, there is a cohesive separation of material within the primer, and in this case, generally, chemical chains in the adhesive primer are broken and hence a clean surface with a high surface energy is generated. Because of the geometrical definiteness of the textile, a uniform and defined surface topology is formed at the same time, and represents an optimum base for the subsequent bonding. Such a surface is guaranteed to be free from contaminations; to be free from the "human factor" in terms of preparation and pretreatment of the joining surface, and guaranteed to be amenable to attachment. The subsequent joining operation with application of the adhesive to the primer therefore takes place with the utmost operational reliability, because the condition of the joining surface is known.

In the case of a flawless joining surface which meets the grade, the adhesive primer attaches uniformly and generally over the full area on the substrate, and indicates correct attachment of the primer on the substrate. The fracture that occurs when the sheetlike textile is removed is cohesive in the primer, and so the boundary face to the substrate withstands the applied load. In this case it can be assumed that the joining surface meets the quality requirement imposed on the bonding.

Where, however, the fracture pattern contains regions in which the primer is in part no longer present on the joining surface, the primer does not attach over the full area on the joining surface, which may be due either to inadequate attachment of the primer on the joining surface or to the presence of further damage in the underlying substrate, the damage having been torn out as well when the test textile was torn off. In both cases, the quality of the joining surface for subsequent bonding was inadequate, as apparent to the naked eye from the fracture pattern both on the joining surface and on the test textile removed. In this case there is no interpretation or intellectual activity required in the evaluation of the fracture pattern, since the simple ascertainment of uniformity of the fracture pattern is sufficient to assume a high-quality joining surface. In the case of a nonuniform fracture pattern exhibiting damage in the fracture face, in particular, the joining surface can be assumed to be inadequate or not flawless for the subsequent bonding.

Alternatively or additionally, the joining surface may also be evaluated quantitatively, by finding the removal force during the removal of the sheetlike test textile. If this removal force (in relation to force/path, for example) runs substantially uniformly and/or within a designated range and/or above a defined threshold value, then the joining surface can be assumed to be flawless and allowable, and flawless mechanical properties can be assumed at the same time. If, however, the removal force shows irregularities, which are manifested in distinct force peaks, and/or if the removal force runs wholly or partly below the defined removal force, then the quality of the joining surface may be assumed to be insufficient (swings of below 30% or below 20% of the mean are considered to be regular, depending on adhesive primer). These usually locally limited force peaks in a removal force profile are the regions in which the adhesive primer has not been fractured cohesively within the primer, but instead where the adhesive primer did not attach on the joining surface or where parts of the substrate of the joining surface were torn out.

The maximum removal force which can occur is defined here by the textile architecture and by the cohesive fracture resistance of the adhesive primer in the designated state. If defects occur, then the removal force at the site in question is always lower than the maximum removal force which would occur in the case of a purely cohesively fracturing adhesive primer. In these regions, the removal force falls below a predetermined threshold value (for example, below the maximum removal force minus tolerance), this being immediately recognizable and suggesting an inadequate joining surface. If the removal force lies beneath the threshold value over the entire test pathway, then the adhesive primer can be assumed to be defective.

It becomes possible accordingly, based on a qualitative evaluation of the fracture pattern and/or on a quantitative evaluation of the removal force, to inspect the underlying joining surface in respect of its capacity to ensure reliable bonding, without having actually to adhere the structural element or to dispose corresponding temporary test elements in the vicinity of the joining surface. The joining surface can instead be inspected directly; in the case of a positive inspection of the joining surface, the joining surface is found at the same time to constitute an optimum base and to provide a corresponding surface energy for the subsequent bonding. Accordingly, the quality of the subsequent bond can also be influenced fundamentally by this method, in a defined way, and the quality of this bonding can be ensured.

It is also possible in this way, furthermore, to carry out indirect process control which is representative of the overall bonding. For example, a test textile as test element may be disposed on additional adhesive primer, for example, next to the repair site, this textile then being removed at a later point in time after use.

With the present invention it becomes possible, moreover, to produce a reproducibly and precisely defined priming coat (film thickness, topology) independently of the amount of adhesive primer applied, since excess primer material is removed together with the test fabric. Furthermore, the method of the invention allows the application of the adhesive primer in film form and/or sheet form to the substrate, meaning that restrictions such as particle size or viscosity of the adhesive primer have only a minor part to play. The attachment of the adhesive primer to the substrate may be verified mechanically over the full area, furthermore, as part of the activation process. Moreover, the present invention permits virtually unlimited storage of the substrate ahead of further processing, since the application of the adhesive primer is decoupled in time terms from the activation. Activation in this case is through the removal of the test textile.

Different curing mechanisms may come into effect according to adhesive primer. For example, chemical reactions such as, for instance, polymerizations (polyaddition, polycondensation, chain polymerization), physical reactions (solidification, evaporation, sol-gel process) or attachment by exposure to pressure are conceivable. Generally speaking, the curing may take place under defined conditions such as, for example, temperature or pressure/reduced pressure, and/or under adhesive-specific conditions (e.g., UV radiation). The curing of the adhesive primer additionally achieves firm attachment to the substrate. In principle, the fiber material of the test textile may be embedded into the adhesive primer, so that the adhesive primer is located below and above the fiber material. It is, however, also conceivable for the fiber material to lie on the adhesive primer, so that there is no adhesive primer located above the fiber material of the test textile.

The joining surface which comes about after the removal of the test textile may be characterized by raised regions and indentations. The indentations here represent the fiber imprints, whereas the raised regions represent the open areas of the fiber material of the test textile. One effect of this is to represent an advantage for the subsequent application of an adhesive film, since the region beneath the film of adhesive can be deaerated by reduced pressure as a result. Accordingly, no air inclusions are produced below the adhesive, a phenomenon which otherwise can lead to pores in the adhesive seam. This problem frequently occurs when adhesive films are applied to smooth surfaces. Included bubbles of air may not be removed by application of reduced pressure, since the evacuation pathway for the air bubbles is blocked by attached adhesive. The film of adhesive, however, does not seal off the channels which generate the fiber material of the test textile, since the film lies initially on the raised regions.

At the same time, the elevations may serve as spacers. In the joining of components, compliance with a defined adhesive film thickness is very important. This is accomplished generally by means of spacers in the adhesive or on the component. These spacers ensure that the components can be approached only to a defined degree. These spacers, however, generally represent a weak point in the bond, since they give rise to a concentration of stress under mechanical load. The raised regions which can come about through the fiber material imprints are able to act as spacers, because the adhesive cannot be pressed completely out of the indentations of the fiber imprints. They are, however, not foreign bodies, but rather part of the adhesive primer remaining on the substrate, and so they do not generate stress concentrations.

In one advantageous embodiment, the fiber material of the sheetlike test textile is an open-pore fiber material or open fabric wherein parallel fibers of the fiber material do not make direct contact with one another. As a result, the adhesive primer is embedded into the resultant interspaces of the fiber material, and this may have the effect of cohesive fracture in the primer, between the individual fibers of the fiber material. Through the choice of textile architecture (e.g., pore size) it is possible in this case to influence the fracture pattern and therefore the surface quality in a manner specific to the application.

Hence the pore size has an influence in particular on the removal force and the resolution of the method in terms of the fracture pattern. The porosity of the textile is also, ultimately, a determinant of what proportion of the fracture surface is fractured cohesively, and which proportion exhibits an imprint of the fibers or of the material of the textile. The appropriate choice of the porosity ultimately determines the percentage free space of the fabric.

In one advantageous embodiment, the fracture pattern between the cured adhesive primer and the sheetlike test textile is recorded by means of a camera, and a uniform or nonuniform fracture pattern can then be ascertained automatically from the recorded image data using an image analysis unit. In this case either the joining surface or the sheetlike test textile after removal, or both together, are recorded by means of the camera, to obtain an image of the fracture pattern after the removal of the sheetlike test textile. Using the image analysis unit, it is then possible to ascertain whether the fracture pattern is uniform, i.e., whether the adhesive primer has undergone clean and defect-free cohesive fracture, or whether the fracture pattern is nonuniform and contains corresponding defects at which the adhesive primer does not attach cleanly/properly on the joining surface.

With an image analysis unit set up accordingly, moreover, it is possible to ascertain whether the adhesive primer attaches over the full area on the joining surface of the substrate. For instance, it is conceivable that, in the case of a defect-free joining surface, a first part of the overall adhesive primer adheres over the full area, in other words without gaps or voids, on the joining surface of the substrate, while a second part of the overall adhesive primer remains on the test textile. With the aid of the image analysis unit, it is possible in that case to ascertain whether the adhesive primer attaches or remains over the full area on the joining surface of the substrate and/or of the test textile, in which case a defect-free joining surface can then be concluded.

It is especially advantageous for this purpose, for example, if a color is chosen for the adhesive primer as a function of the color of the substrate and/or of the color of the joining surface of the substrate, so as to maximize the contrast between the color of the substrate joining surface and the color of the adhesive primer. By means of a maximum contrast it is possible accordingly for defects within the fracture pattern to be recognized more effectively and identified more easily.

The color may also be selected, moreover, by selection as a function of the color of the test textile or of the fiber material of the sheetlike test textile, in order thus to allow better recognition of irregularities and/or defects of the fracture pattern on the sheetlike test textile.

Furthermore, it is also advantageous if the removal force during the removal of the sheetlike test textile is found using a force sensor, in which case a uniform or nonuniform force profile may be ascertained from the found removal force using a force analysis unit. By this means as well it is possible to automate the operation of analyzing/evaluating the fracture pattern. Alternatively or additionally, the force analysis unit can be used to ascertain, from the removal force found, whether the removal force runs wholly or partially below a threshold value, thus indicating a defective joining surface as a quantitative evaluation.

The image analysis unit and also the force analysis unit here may run in the form of software modules on a digital computing unit, the computing unit in that case being joined in signaling terms to the camera or to the force sensor, respectively.

In a further advantageous embodiment, the sheetlike test textile, after the curing of the adhesive primer, is additionally conditioned, so as to expose the adhesive primer additionally to external influences. For this purpose, the test textile is exposed to a predetermined test temperature over a predetermined timespan and/or is associated with a medium over a predetermined timespan, and the test textile is removed only after the conditioning. The medium in this case is able to diffuse through the thin film in a short timespan into the boundary layer, meaning that critical scenarios for the connection can be generated and likewise tested. This allows conclusions to be drawn about the loading of the bond in real-life operation, and so consequently the testing can also be more in-depth than just the pure inspection of the joining surface. In this case in particular the (open) adhesive primer of the test textile is brought into association with the medium and conditioned.

When the test textile is removed, the test textile leaves behind an impression in the surface of the fractured adhesive primer. One of the effects of this is to increase the surface area, which is advantageous for a later bonding operation. A second effect of this is to provide mechanical anchorage (form-fitting) between adhesive primer and adhesive, which is likewise advantageous for the strength.

It is conceivable and advantageous accordingly, for example, for the fiber material of the test textile provided to be configured such that the impression of the fibers of the fiber material that remains in the adhesive primer has undercuts following the removal.

In a further advantageous embodiment, the fiber material of the test textile provided has an equidistant lattice, and so the impression remaining on the surface of the primer has a defined grid. This facilitates the visual evaluation and quantification of any defects, since a kind of measuring grid is impressed in the surface.

In a further embodiment it is conceivable for the entire surface of the adhesive primer to have undergone complete cohesive fracture. In this case, the attachment forces between fiber material of the test textile and primer must be greater than the forces needed for cohesive fracturing of the primer. In such an event, the test textile leaves behind a completely cohesively fractured surface. Hence the fiber material of the test textile may be pretreated, for example, mechanically, physically and/or chemically, in order to roughen it (to bring about a surface condition which is advantageous for the development of adhesion forces) and so to increase the attachment forces of the primer on the fiber material. Examples of a mechanical pretreatment would include blasting and abrading, and examples of a physical pretreatment would include plasma treatment, corona treatment, and flaming. Examples of a chemical pretreatment would include etching, fluorinating, coating, or treatment with acids or alkalis or other substances which alter the surface. The roughening of the fiber material also increases the free surface area of the primer, thereby enabling even better attachment of the adhesive film.

In a further advantageous embodiment, the fibers of the fiber material may also have been provided with a specific coating serving as an adhesion promoter. After the removal of the test textile, in the region of the fiber imprints, this coating may remain on the surface of the primer and, in the course of subsequent bonding, may take on functional tasks or, for example, may improve the attachment to the adhesive or may function, for example, as a crack stopper for the later adhesive layer.

In accordance with the present invention, the adhesive primer may first be completely cured before the sheetlike test textile is removed. As a result of this complete curing, the test textile can remain on the substrate joining surface pending the further processing of the substrate, and is able accordingly to protect the joining surface from contamination. Also conceivable, however, is only partial curing of the adhesive primer before the test textile is removed. By this means, the probability of a cleanly cohesively fractured surface after the removal can be improved, and residual reactivity of the adhesive primer may lead to better bonding with the subsequently applied adhesive.

The cohesive fracture of the adhesive primer generates a reactive surface having a high surface energy; as a consequence, components adhered later attach more effectively.

In order to achieve a defined film thickness of the remaining adhesive primer, spacers may be used. In the most simple form, the fibers of the fiber material, or the fiber material itself, represent(s) the spacers. Also conceivable, however, is for the test textile to comprise additional spacers, in order to achieve a predetermined film thickness of the adhesive primer remaining on the substrate. Such spacers may be integrated into the fiber material or may be part of the adhesive primer between substrate and test textile fiber material. Such spacers may be additional fabrics, such as thin nonwoven mats, meshes and/or tied fabrics, for example, or a multiplicity of uniformly distributed bodies, such as beads of defined size, for example. The spacers present in the adhesive primer remain in the adhesive primer that remains on the substrate.

The object is also achieved, moreover, with the method according to claim 12 for applying an engineering material to a substrate, wherein the joining surface is first inspected using the above-described method. If the inspection of the joining surface was positive, in other words there were no irregularities in the fracture pattern or no discernible irregularities in the removal force, the engineering material is applied to the adhesive primer which remains after the removal of the sheetlike test textile.

The engineering material may be an adhesive, an adhesive with structural element for joining, and/or a coating (such as paints, for example).

In one embodiment the substrate is a fiber composite component produced from a fiber composite material comprising a fiber material and a matrix material.

The substrate may alternatively be a different, more particularly isotropic, material, such as, for example, a polymer material, metal material, organic materials and/or inorganic materials. Polymer materials used may be, for example, thermosets (epoxides, unsaturated polyesters, vinyl esters, phenolic resins), elastomers (rubber, polysulfides, silicones, polyurethanes), thermoplastics (polyetherketoneketone, polyamide, polyesters, etc.). Metal materials that are contemplated include, in particular, steel, aluminum, titanium, magnesium, nonferrous metals, etc. Organic materials that may find application include, in particular, bone, wood, and teeth. Inorganic materials conceivable are, in particular, glass, cement, ceramic, stone, or mixtures thereof. The substrate here can specifically not be a fiber composite component produced from a fiber composite material.

In another advantageous embodiment, especially in conjunction with a fiber composite component as substrate, the engineering material is an adhesive material, and a structural element is joined by means of the adhesive material applied to the adhesive primer which remains after the removal of the sheetlike test textile. For this purpose, an adhesive may be applied to the adhesive primer which remains on the joining surface, and this adhesive is then brought into contact, subsequently, with the structural element, and thereafter cured so as to bring about a firm adhesive bond. Also conceivable, however, is for the adhesive and the structural element to be applied and joined simultaneously, when, for example, the structural element is a prepreg wherein matrix material has already infused into a fiber material. The structural element may alternatively be an engineering material which inherently comprises an adhesive material, such as, for example, surface coatings, sealants, prepregs or paints.

As is also the case for the method for inspecting the joining surface, it is possible for the joining surface to be pretreated for bonding prior to the inspection of the joining surface, by the removal for this purpose, for example, of damaged material from the fiber composite component by milling or cutting. After the clean pretreatment of the damaged site to be repaired, the joining surface is then inspected with the method described previously, and then the structural element is adhered.

If the structural element for joining is a repair patch, then it is conceivable, for example, to introduce a taper into the fiber composite component, in the region of the damaged site to be repaired; in that case, based on the cross section of the taper, a repair patch corresponding to it is produced. The taper is then likewise inspected with the above-described method, and, if the inspection of the joining surface was positive, the repair patch is then bonded into the taper.

The object is also achieved, moreover, with a device for inspecting a joining surface of a substrate, especially of a fiber composite component, according to claim 16, where the device has a camera and an image analysis unit and/or has a force sensor and a force analysis unit, and is configured for carrying out the inspection method as described above. The camera and the image analysis unit here serve for qualitative evaluation, while the force sensor and the force analysis unit serve for quantitative evaluation of the joining surface and of the primer material.

Based on the qualitative evaluation and/or the quantitative evaluation of the joining surface, it is then possible to deduce whether the joining surface is sufficiently suitable for bonding, or whether further preparatory measures must be carried out.

Figure 1B:
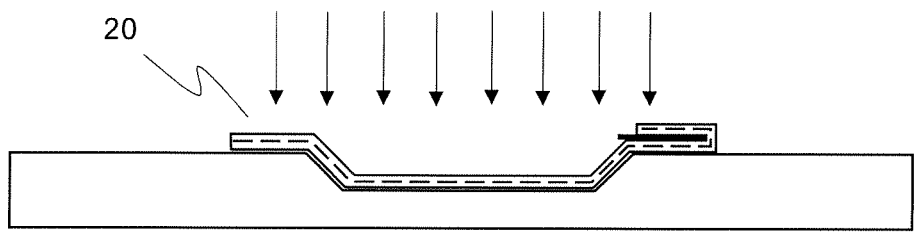
Figure 1B:
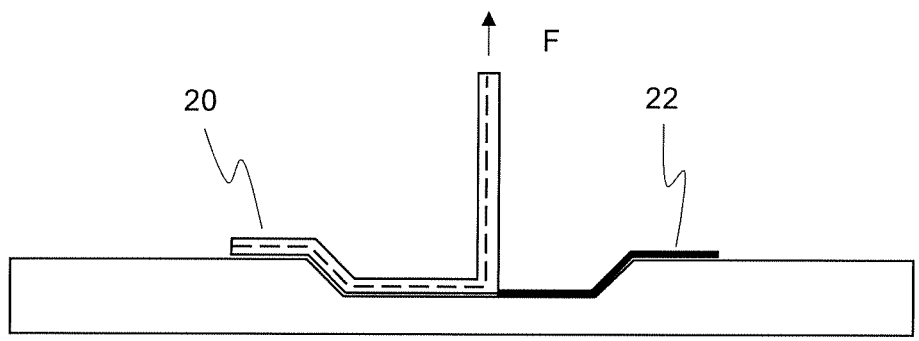
Figure 1B:
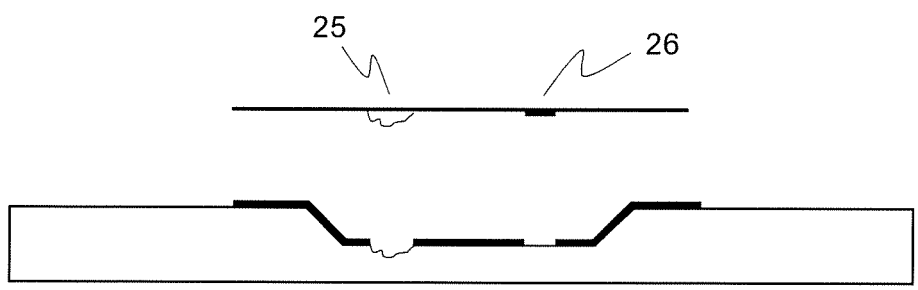
Figure 1C:
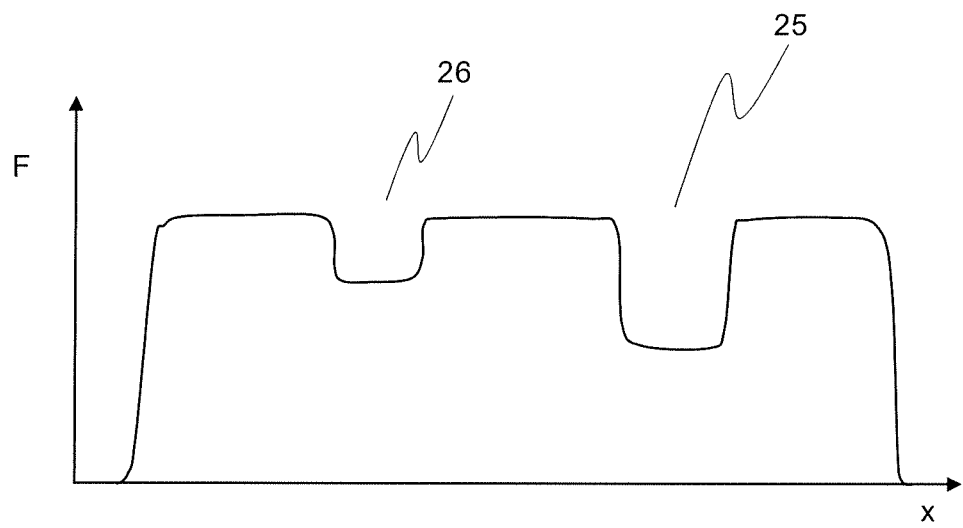
Figure 2:
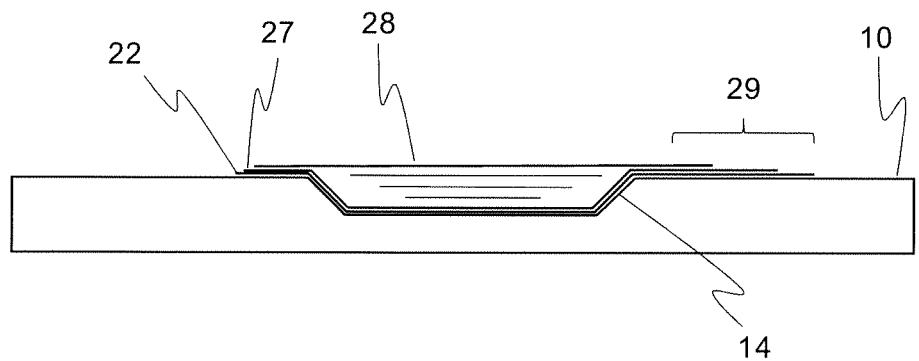
Figure 3:
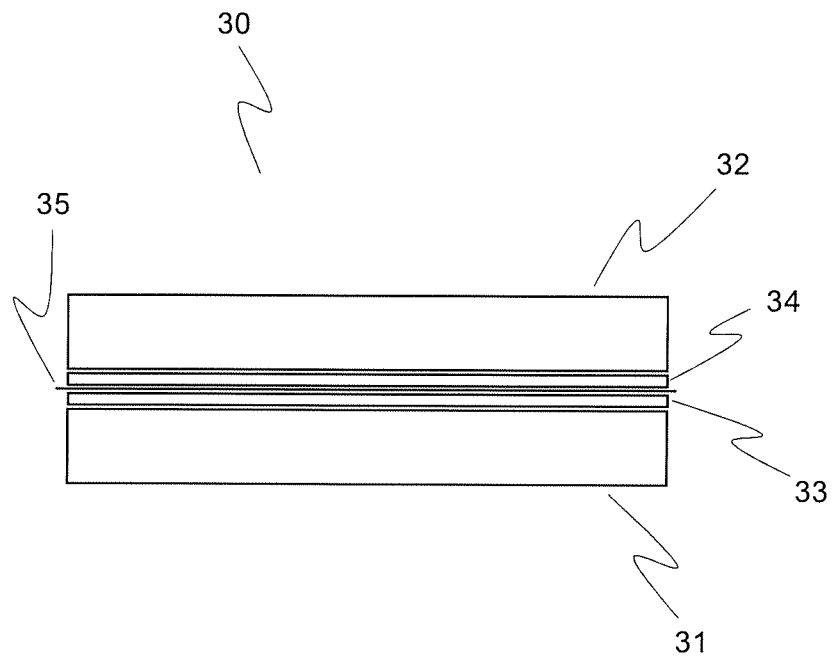

Further explanation of the invention is given, by way of example, using the appended figures, in which FIGS. 1a-1c—show schematic representation of the key method steps for the inspection;

FIG. 2—shows schematic representation of a repair based on the inspection;

FIG. 3—shows an exemplary embodiment of an inspection; and

Figure 4:
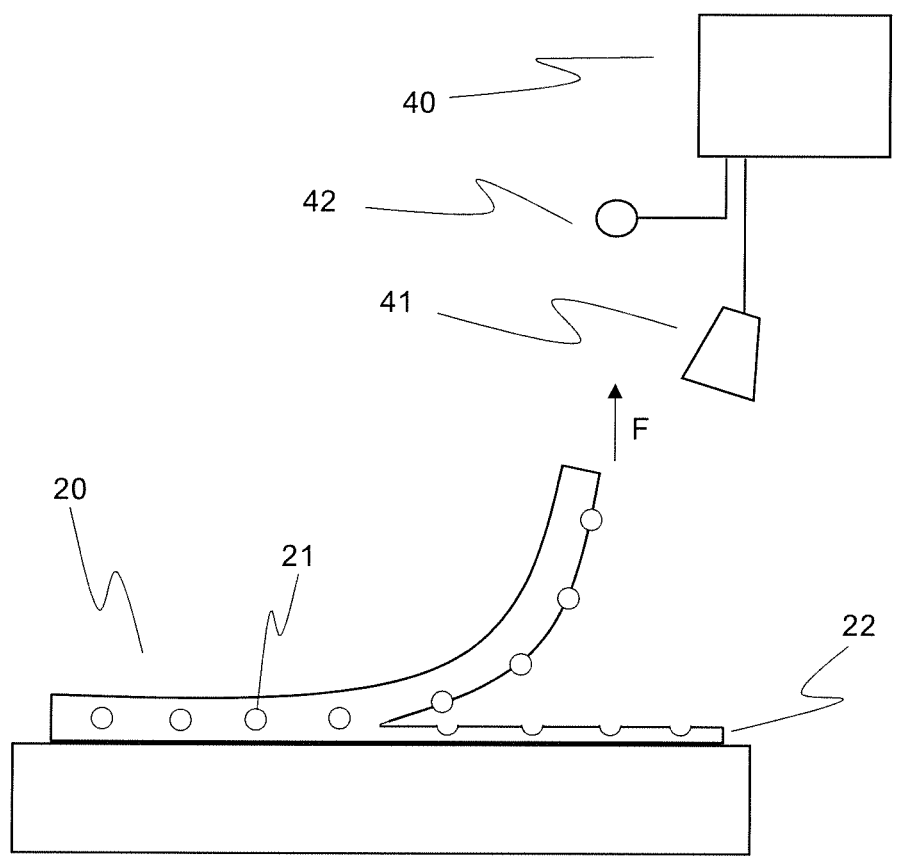

FIG. 4—shows schematic-macroscopic representation of a fracture pattern.

FIGS. 1a-1c show a possible course of the inspection method in a schematic representation. Provided first of all in the first step (a) is a substrate in the form of a fiber composite component 10, which is composed of plural plies of fiber material 11. The fiber composite component 10, represented here in a cross section, exhibits damage 12 which is to be repaired. This damage 12 extends here over plural fiber material plies 11.

In the next step (b), the damaged region 12 of the fiber composite component 10 is removed, by the introduction of a taper 13 into the fiber composite component 10 over a large area.

This taper 13 for removing the damaged region 12 may be made manually or mechanically, and is commonly also referred to as surface preparation. It is followed by the surface pretreatment, which may be accomplished by abrading, blasting or milling, for example. This operation may also include cleaning or activating operations (by plasma, for example). The result of the second step (b) is then a joining surface 14 which is to be introduced later into a repair patch. This joining surface 14, following step (b), has been made ready to an extent such that the step of adhesive bonding can commence. Now, in accordance with the invention, the joining surface 14 is first inspected, in order to ensure the effectiveness of the bonding.

For this purpose, in step (c), a sheetlike test textile 20 is inserted onto the joining surface 14 of the taper 13, with the sheetlike test textile 20 having a fiber material 21 which is impregnated by an adhesive primer 22.

In edge regions, the sheetlike test textile can be wrapped around, so as to generate a tab 23 for the subsequent removal. In order to prevent the tab 23 sticking to the test textile 20, a release film 24 may be provided between tab 23 and test textile. Also conceivable is for a tab preventing attachment to be generated by means of a release film like that placed onto the fiber composite component 10 in edge regions.

When the test textile 20 has been applied to the joining surface 14, the next, subsequent step (d) sees the test textile being consolidated, i.e., cured. For this purpose the test textile 20 is exposed to heat and optionally pressure. The treatment of the applied sheetlike test textile 20 ultimately depends on the manner in which the adhesive primer of the test textile 20 cures. If the adhesive primer used was a matrix material corresponding to the matrix material of the fiber composite component, or corresponding to the adhesive of the later bond, then in general the test textile is exposed to a temperature and a pressure corresponding, for example, to the elevated temperature and pressure involved in a vacuum system customary for fiber composite technology.

In a subsequent, optional step, the test textile may be conditioned for more in-depth testing, by exposing it to a desired test temperature and optionally to a medium. The medium may for example be water or other substances with which the fiber composite component regularly comes into contact. The medium is able to diffuse, for example, through a thin film into the boundary layer within a short timespan. The subsequent testing takes place under the influence of media and temperature, therefore, and so critical scenarios for the bond can also be generated.

Then, in the subsequent step (e), the test textile 20 is removed by means of the tab 23 from the joining surface 14, either manually or mechanically. The entire test area, i.e., the joining surface 14, may also be covered with a plurality of planar test textiles in a defined width, which are removed individually. As a result, a comparable removal force based on the textile width is measured. The removal angle, the removal rate, and the removal direction in relation to the fiber orientation may be defined here according to requirements.

In one advantageous configuration, the edges of these strips of test textile are configured in such a way as to prevent tears extending into the strips. For this purpose it is conceivable in particular for the strips to be thermally sealed at the edge or to have, for example, a woven margin.

In the normal scenario, the removal of the test textile is accompanied by cohesive fracture in the adhesive primer, with the consequence that parts of the adhesive primer remain on the joining surface 14 and a surface is formed that is defined, clean, and ready for the subsequent bonding. If it has been ascertained, after the removal of the test textile 20, that the entire primer attaches uniformly, completely, and without defect on the joining surface 14, then the adhesive primer has been fractured cohesively over the entire area of the test textile, suggesting that the boundary face to the fiber composite component 10 has withstood the applied loading. In this case, the adhesive and the repair material can be applied directly to the primed joining surface 14.

If, however, the fracture pattern exhibits irregularities, damage or defects, then the prepared/pretreated joining surface 14 present was inadequate, and reliable bonding cannot be carried out on such a surface. Resultant defects of this kind which can be seen from the fracture pattern are recognizable in step (f). Shown here, schematically, is the removed test textile, which, in a first region 25, contains not only parts of the adhesive primer 22, which ought actually to attach on the joining surface 14, but also parts of the fiber composite component 10, thus producing an irregularity or defect site in the fracture pattern in the region 25. In this region, the base of the joining surface 14 lacked sufficient stability, and so the attachment of the adhesive primer 22 on the joining surface 14 resulted in a greater attachment than commonly in the region 25 in the fiber composite component 10. The surface pretreatment in the region 25 was therefore not sufficient.

In a further region 26, on the other hand, the adhesive primer 22 did not attach sufficiently on the joining surface 14, again suggesting an insufficient surface pretreatment of the joining surface 14. In the region 26 as well, the fracture pattern, in the case both of the fiber composite component and of the test textile, shows an irregularity or defect site which is immediately apparent to the naked eye.

Accordingly, on the basis of the fracture pattern, it is possible to carry out a qualitative evaluation for the purpose of inspecting the joining surface, by ascertaining whether the fracture pattern, on the joining surface 14, for example, exhibits defect sites or irregularities which manifest themselves in a lack of consistent attachment of the attaching adhesive primer on the joining surface 14.

Alternatively or additionally, it is also possible for the removal force (F) on removal of the test textile 20 to be found and then dissipated over the test path, and this is shown in step (g). The regions 25 and 26 here correspond to the regions 25 and 26 in step (f), where the fracture pattern exhibits corresponding defect sites. In these regions, the removal force subsides suddenly, resulting from deficient attachment of the adhesive primer or of the fiber composite material of the fiber composite component. Here again, deviations from a uniform removal force may be used to conclude the presence of corresponding defect sites. It becomes possible, accordingly, to inspect the joining surface not only directly in relation to its nature, for the purpose of adhesive bonding, but instead also at the same time, in the case of a successful inspection, to ready the joining surface for the subsequent bonding operation to an extent such that a defined adhesive area is formed, on which a corresponding bond can be guaranteed in a defined way.

The repair of the fiber composite component 10 shown in FIGS. 1a-1c can be seen in FIG. 2. When the inspection steps of FIGS. 1a-1c have been carried out, a part of the adhesive primer 22 remains on the joining surface 14 of the fiber composite component 10. The corresponding adhesive 27 for the repair is then applied to this adhesive primer, and subsequently the repair patch 28 is introduced into the taper. The repair patch 28 may likewise, for example, be a fiber composite material. The layer 27 of adhesive in this case may be introduced simultaneously with the repair patch 28, in the form of a prepreg.

Optionally, in a secondary test region 29, an end of the test textile 20 and/or an end of the adhesive 27, with a test fabric, may be disposed. By way of these it is possible to inspect the attachment of the adhesive to the primer. Moreover, this region may be utilized for a long-term test of the attachment of the primer to the fiber composite component, and also of the adhesive to the primer. For this purpose, the test fabric remains in the corresponding material (primer or adhesive) and is not removed until a later point in time. In the interim, the secondary test region can be painted over, so that it has no influence visually and aerodynamically.

It is also conceivable, however, for the attachment of the adhesive 27 to the repair patch 28 to be inspected using the test textile. For this purpose, a release film is placed under the desired region, the adhesive is provided with the test textile, and the repair patch is applied over it. After the curing of the repair patch, the region is separated from the component by the release film. The test textile is subsequently removed from the separated region, and the interface between adhesive and the repair plies lying above it is loaded and therefore tested. It is possible accordingly to test all of the interfaces of the connection system: component/primer, primer/adhesive, and adhesive/repair patch. Also conceivable, however, is the inspection of the attachment of the adhesive 27 to the material of the repair patch 28 by means of the test textile. For that purpose, alongside the patch, a region is covered with release film, the adhesive is provided with the test textile, and the material of the repair patch is applied over it. After the curing of the repair patch, the additional region is separated from the component by the release film.

All of the test elements in the secondary test region 29 may be tested either directly after the repair (or after optional conditioning), or else only at a later point in time, for the implementation of a long-term test. Before the long-term test is carried out, the test sections may likewise be conditioned.

The test elements in the secondary region 29 may be connected directly to the actual bond or may be separated from it by an interruption/gap.

For process control in component fabrication and/or bonding, tag-along specimens with a control attachment may be fabricated, serving to validate the process and the correct attachment of adhesive to the components. For this purpose, in addition to the regular joining partners, a test connection is constructed as is shown in FIG. 3. In the case of this test connection, a first test element 31 and a second test element 32 are used, a first test textile 33 being disposed on the first test element 31, and a second test textile 34 on the second test element 32. The first and second test elements are then joined to one another by means of their two test textiles, with a release film 35 being disposed between the two test textiles. Then, in the next step, a regular bond is performed, both of the component actually under production and of the test connection 30, so that the control bond is carried out in one operating step together with the actual component bond.

Subsequently, by means of the release film 35, the two joining partners 31 and 32 of the control connection 30 are separated, and subsequently the test textile 33, 34 can be removed from each of the two test elements 31 and 32, as described above, by the application of a removal force. Subsequently, both test elements can be inspected by qualitative and/or quantitative evaluation of their joining surface, with the result of this testing being representative of the joining process of the fabricated component join.

In this context it would be conceivable for the test connection 30 not to be a control fabrication, but rather the component connection to be produced; in that case, in a first step, the two joining partners are joined to one another as in the test connection, and then, subsequently, the test textile is removed from both joining partners 31 and 32. If the two fracture patterns of the removed joining surface and of the test textiles, respectively, are without findings, then in a next step the two joining partners can be bonded to one another using a layer of adhesive. The test textile is required, during removal, to transmit a force of defined height to the adhesive primer or to the joining surface, respectively, and so to leave behind a thin primer layer whose surface is clean and is amenable to attachment for a subsequent bonding operation. In order for the test textile to be nevertheless removed conveniently from the surface, with little application of force, the removal may take place, as described above, in narrow strips of defined width. The requirements imposed on the test textile are achieved by employing a woven fabric having an open structure.

Via the architecture of the test textile (type of weave, cross-sectional construction, thread configuration, single/multiple filaments, linear thread density, free cross-sectional area, etc.) it is possible, among other things, to adjust parameters such as the extent of the test force or test tension (the tension with which the interface in question is loaded), the extent of the removal force (the force required to remove the textile), resolutions for any defects, areal proportion of the cohesive fracture, film thickness of the primer left behind, and surface topology of the priming coat generated.

The test textile may in principle consist of any materials. Examples are plastics, natural materials, or metals. The particular material is processed to a sheetlike structure, which may be a textile in the conventional sense—that is, for example, a woven or knitted fabric. However, sheetlike structures such as, for example, expanded metal or lattices or meshes are also conceivable.

The test textile may in principle have been impregnated with primers beforehand or else may be in dry form and may not be impregnated until during application, in situ, by the application of adhesive or primer to the test textile.

With regard to FIG. 3, the following scenarios are conceivable: firstly, both test elements may be present in uncured form prior to control bonding, and may be cured in this operation with the test textile. Prior to the control bonding, furthermore, one of the test elements may be uncured and the other in consolidated form. Lastly, both test elements may be cured.

FIG. 4 shows, schematically, the process of removal for an open fabric made from single-filament threads with a circular cross section.

In the removal operation, the fiber material 21 detaches from the adhesive primer 22, and the free surfaces between the individual fibers of the fiber material 21 undergo cohesive fracture.

The precise topography of the surface generated is adjustable through the properties of the test textile and/or through the form of the fiber material. For example, an angular cross section of the fiber material, with undercuts, can also be utilized in order to generate a relatively uniform, thin priming coat.

As a result of the removal of the test textile and the formation of a thin priming coat on the joining surface, a particularly adhesive surface is generated. The surface is therefore very well prepared for the subsequent adhesive joining operation.

For automated operation, it is possible here to provide a computer unit 40, which is connected to a camera 41 and/or to a force sensor 42, as represented schematically in FIG. 4 in a greatly simplified representation. The camera 41 in this case records the fracture surface of the cohesively fractured primer, and corresponding irregularities and also attachment of the primer 22 not over the full area on the component can be recognized with the aid of an image analysis on the computer unit 40. If the test textile is removed in an automated way using a device, then the force F can be detected by means of the sensor 42. Through analysis of the force profile it is then possible to inspect the surface as described above.

With the aid of the method of the invention, it also becomes possible here to test highly curved surfaces. This is not a possibility with the great majority of conventional approaches. Moreover, the method of the invention allows the joining surface to be inspected independently of ply and/or independently of position. After the testing for defects and the ascertainment of a defect-free surface, the method of the invention produces a clean, defined surface to which, subsequently, bonding can be carried out directly. In contrast to conventional repair procedures, however, the surface quality is not dependent on the human factor. The method of the invention makes it possible, furthermore, to fix the condition of the pretreated joining surface.

Application of adhesive need not therefore take place immediately after the end of the surface pretreatment. Accordingly, a repair process can be made more flexible in terms of time. Lastly, the invention also allows the detection of contaminations which take effect only during the bonding operation at elevated temperature, by diffusion from the substrate material interior to the surface, for example. This risk cannot be recognized by customary surface analysis methods, prior to bonding.

The adhesive primer may constitute a reactive substance, based on epoxy, for example, which has a similar profile of properties to the adhesive used for the repair, but whose precise properties can be tailored to the specific task (in the simplest case: adhesive primer=adhesive). This includes, among other things, the implementation of a very strong attachment to the substrate, good tolerance of contamination, and the capacity to enable particularly effective attachment to the adhesive in a downstream step. The color of the adhesive primer is made such that it is readily distinguishable from the substrate with the test textile so that defects can be easily recognized visually. The formulation of the primer may be such that its property changes during the later curing of the adhesive film, and takes on the desired final property. This corresponds to a heating step during the curing of the adhesive film at elevated temperature. Thus, for example, it is possible for the primer still to possess a residual reactivity after the curing of the test textile, in other words not to be completely reacted, and as a result to crosslink with the adhesive in the subsequent bonding operation and therefore to enter into particularly strong chemical bonds.

The textile in this case is in particular not provided with additional coatings such as release agents, which after testing could remain as an adhesion-inhibiting residue on the surface of the primer. In terms of the filament density or linear thread density and the weave and/or areal distribution, the textile is configured so that it leaves behind a regular surface and a defined, thick layer of the primer after removal.

The removal textile may have designated fracture sites at regular width intervals, with these sites segmenting the textile into strips. This allows application to take place on one piece, and at the same time the individual segments can be removed as strips of defined width, with the force being recorded in relation to a defined width.

The test textile with the fiber material and the adhesive primer is adapted such that, on correct surface preparation and surface pretreatment, the attachment between substrate and primer, and also the strength of the substrate, are higher than the force required to bring about the cohesive fracture in the adhesive primer. This means that, in the case of correct implementation, the interface between removal textile and primer always represents the weak point. In the case of relevant defects/contaminations in the substrate surface, these regions represent the weak point—in other words, the strength of these regions is below that between removal textile and primer, this being manifested in the change in the fracture pattern, since corresponding defects are then perceptible in said fracture pattern.

LIST OF REFERENCE NUMERALS

10—fiber composite component
11—fiber material plies
12—damage
13—taper
14—joining surface
20—test textile
21—fiber material of the test textile 22—adhesive primer
23—tab
24—release film
25—first irregularity in the fracture pattern
26—second irregularity in the fracture pattern
27—adhesive
28—repair patch
29—secondary test region
30—test connection
31—first test element
32—second test element
33—first test textile
34—second test textile
35—release film

The invention claimed is:

1. A method for inspecting a joining surface of a substrate, comprising:
    providing at least one sheetlike test textile which comprises a fiber material and an adhesive primer,
    applying the at least one sheetlike test textile to at least part of the joining surface of the substrate to which a structural element is to be adhered so that the adhesive primer of the at least one sheet test textile makes contact with the joining surface of the substrate,
    at least partly curing the adhesive primer of the at least one sheetlike test textile to connect the at least one sheetlike test textile to the substrate using the adhesive primer, wherein the at least partly curing step produces a cured adhesive primer,
    removing the at least one sheetlike test textile after the at least partial curing of the adhesive primer, and
    inspecting the joining surface to ascertain whether there is a defect-free attachment of the adhesive primer over a full area of the joining surface by at least one of either:
    a) performing a qualitative evaluation of a fracture pattern formed between the cured adhesive primer and the at least one sheetlike test textile during the removing step of the at least one sheetlike test textile, and determining the joining surface as having defect-free attachment when the fracture pattern is uniform, and as having defective attachment when the fracture pattern is nonuniform; or
    b) performing a quantitative evaluation of ascertaining whether the removal force determined during the removing step of the at least one sheetlike test textile has a uniform force profile, and determining the joining surface as having defect-free attachment in the case of ascertaining the uniform force profile, and defective attachment in the case of ascertaining a nonuniform force profile.

2. The method as claimed in claim 1, wherein the substrate is a fiber composite component produced from a fiber composite material comprising a fiber material and a matrix material.

3. The method as claimed in claim 1, wherein the substrate is formed of one or more of a polymer material, metal material, a metal alloy, an organic material, and an inorganic material.

4. The method as claimed in claim 1 further comprising recording the fracture pattern between the cured adhesive primer and the at least one sheetlike test textile using a camera, a uniform or nonuniform fracture pattern being ascertained from recorded image data using an image analysis unit, and/or in that the removal force during the removal of the sheetlike test textile is ascertained using a force sensor wherein a uniform or nonuniform force profile is ascertained using a force analysis unit.

5. The method as claimed in claim 1 further comprising conditioning the at least one sheetlike test textile during and/or after the curing of the adhesive primer by exposing the at least one sheetlike test textile to a predetermined test temperature over a predetermined timespan and/or by associating the at least one sheetlike test textile with a medium over a predetermined timespan, wherein the step of removing the at least one sheetlike test textile is performed after the step of conditioning.

6. The method as claimed in claim 1 wherein the adhesive primer is completely cured before the at least one sheetlike test textile is removed.

7. The method as claimed in claim 1 wherein the providing step is performed such that the at least on test textile comprises one or more spacers disposed on the fiber material of the at least one test textile and/or one or more spacers contained in the adhesive primer.

8. The method as claimed in claim 1 wherein only a) is performed.

9. The method as claimed in claim 1 wherein only b) is performed.

10. The method as claimed in claim 1 wherein both a) and b) are performed.

* * * * *